(12) United States Patent
Chio

(10) Patent No.: US 7,413,404 B2
(45) Date of Patent: Aug. 19, 2008

(54) SAIL WING TYPE WINDMILL

(76) Inventor: Chuy-Nan Chio, 4F-2, No. 333, Fu-Shing N. Rd., Taipei (TW)

( * ) Notice: Subject to any disclaimer, the term of this patent is extended or adjusted under 35 U.S.C. 154(b) by 0 days.

(21) Appl. No.: 11/534,221

(22) Filed: Sep. 22, 2006

(65) Prior Publication Data
US 2007/0014663 A1 Jan. 18, 2007

Related U.S. Application Data

(63) Continuation-in-part of application No. 10/958,253, filed on Oct. 6, 2004, now abandoned.

(51) Int. Cl.
*F03D 3/06* (2006.01)
(52) U.S. Cl. .................. 416/17; 416/116; 416/132 B; 415/4.2
(58) Field of Classification Search .............. 416/9, 416/17, 112, 113, 116, 132 B; 415/4.2, 907
See application file for complete search history.

(56) References Cited

U.S. PATENT DOCUMENTS 2,397,346 A * 3/1946 Ramos Gimenez .......... 416/17

* cited by examiner

*Primary Examiner*—Richard Edgar

(57) ABSTRACT

A sail wing type windmill includes an output shaft erected vertically, a foundation with a bearing disposed in the center hole provided therein for supporting the output shaft; an axle body with a roller bearing on the top end, while the bottom end thereof being conjoined to the output shaft, and the external surface thereof being formed of several spigots, and provided with an upper and a lower joint flanges; and a rudder assembly turnably conjoined to the top end of the output shaft and consisting of a turn table and a twin vaned tail wing; wherein the turn table is inserted in the center hole of the axle body, the external surface of the turn table is provided with a snaking recessed lead rail terminated into a lead portion. The twin vaned tail ring can automatically and constantly point to the wind direction so as to turn the turn table with the wind force.

2 Claims, 9 Drawing Sheets

SAIL WING TYPE WINDMILL

RELATED APPLICATIONS

This application is a continuation-in-part of U.S. patent application Ser. No. 10/958,253, filed on Oct. 6, 2004 now abandoned.

BACKGROUND OF THE INVENTION

1. Field of the Invention

The present invention is related to a sail wing type windmill utilizing a pressure difference produced between the wind pressure exerted on the front surface of the sail wing and the rear surface thereof together with the flywheel effect to operate the windmill.

2. Description of the Prior Art

The windmill has been utilized to convert the wind power into mechanical power for hundreds of years, and further with the aid of the flywheel effect and speed governor, the mechanical power is stabilized and qualified to drive the generator thereby finally the windpower is converted into electric power.

In a typical windmill power station, a horizontal shaft windmill composed of three or four vaned wings with flywheels is coupled to drive the generator with the windmill. The rotating power of the windmill comes from upwards and downwards wind flow attacking the wing blades of the windmill, whereas the flywheel is for storing the kinetic energy and governing the rotational speed of the windmill. However, the conventional technique used to convert the windpower (mechanical power) into the electric power described above has several shortcomings, namely:

(1) The efficiency of energy conversion is so low as only 20~30%, as a matter of fact, the wind direction changes from time to time, this might lower the efficiency even down to 70% of its original value. If the generator loss is taken in consideration, the final efficiency might even be more lowered.

(2) Traditionally, the windmill needs a very high tower to support the wings and flywheels which requires a high investment for establishment and routine maintenance.

(3) A windage force produced during cutting wind by wing blades and flywheels might become overturning torque to destroy the structure of the windmill.

(4) Time lag in guiding the direction of wing blades to accept the wind power effectively results in losing the effective area of the wing blades.

For these defects committed by the conventional horizontal type windmill in the past, an improvement is seriously required. The inventor has dedicated great efforts for years to studying and improving these defects and come up with a novel sail wing type windmill as provided in this invention to eliminate the defects inherent to the prior arts.

SUMMARY OF THE INVENTION

Accordingly, it is an object of the present invention to provide a sail wing type windmill to convert the windpower into the mechanical power with a high efficiency.

Another object of the present invention is to provide a sail wing type windmill which can work in all direction without the need of tracing the wind direction from time to time, and the windmill can be fabricated and assembled with reduced cost while it can be operated securely.

To achieve the aforesaid objects, the sail wing type windmill of the present invention includes an output shaft, a foundation, an axle body and a rudder assembly.

The output shaft is erected vertically. The foundation with a bearing is disposed in its center hole for supporting the output shaft to rotate on the bearing.

The axle body with a roller bearing is equipped at the top end in its center hole, while the bottom end thereof is conjoined to the output shaft, and its external surface is formed of several spigots, and provided with an upper joint flange and a lower joint flange.

The rudder assembly turnably is conjoined to the top end of the output shaft, which includes a turn table, and a twin vaned tail wing. The turn table is inserted into the center hole of the axle body, the external surface of the turn table is provided with a snaking recessed lead rail terminated into a lead portion thereof, and the twin vaned tail wing is able to constantly pointed to the wind direction and turns the turn table with wind force.

A wing blade assembly comprises two bracing bars, an upper sail wing, a lower sail wing, and several follower units. The bracing bars are respectively jointed to the upper and the lower joint flanges of the axle body with their one end. The upper sail wing is jointed to the rear edge of the upper bracing bar, while the lower sail wing is jointed to the rear edge of the lower bracing bar. The follower unit is composed of a connecting rod, a fixed guide ring, a follower portion, and a rolling portion. The follower unit is held at the end portion of the bracing bar with the fixed guide ring, and is fixed to the upper and lower sail wings. The rolling portion is installed at one end of the connecting rod, while the connecting rod passes through the fixed guide ring and the follower portion to be able to rotate in the fixed guide ring and conjoined to the follower portion.

The twin vaned tail wing in the rudder assembly can automatically turn to face against the wind direction, and keeps perpendicular to the lead portion of the lead rail formed on the turn table. Hence, in case the twin vaned tail wing automatically turns to face against the wind direction, the wing blade assembly is carried along the lead rail to the lead portion by rolling portion which, at the same time, rotates the connecting rod. The connecting rod which being in connection with the upper and lower sail wings brings the two sail wings to develop downwards so as to winden their surface against the wind direction until reaching the ultimate position where both sail wings are completely downwardly developed and perpendicular to the wind direction. At this state, the reception of wind power is at the maximum state resulting in an increased speed of the output shaft. Other wing blade assemblies whose rolling portions being not yet arrived at the lead portion keep their wing surfaces parallel to the wind direction to evade the wind resistance.

BRIEF DESCRIPTION OF THE DRAWINGS

The drawings disclose an illustrative embodiment of the present invention which serve to exemplify the various advantages and objects hereof, and are as follows.

DETAILED DESCRIPTION OF THE PREFERRED EMBODIMENT

Referring to FIG. 1 through FIG. 9, the sail wing type windmill of the present invention is composed of an output shaft 1, a foundation 2, an axle body 3, a rudder assembly 4, and several wing blade assemblies.

The foundation 2 is provided with a bearing (not shown) disposed in its center hole for supporting the output shaft 1 vertically.

Figure 1:
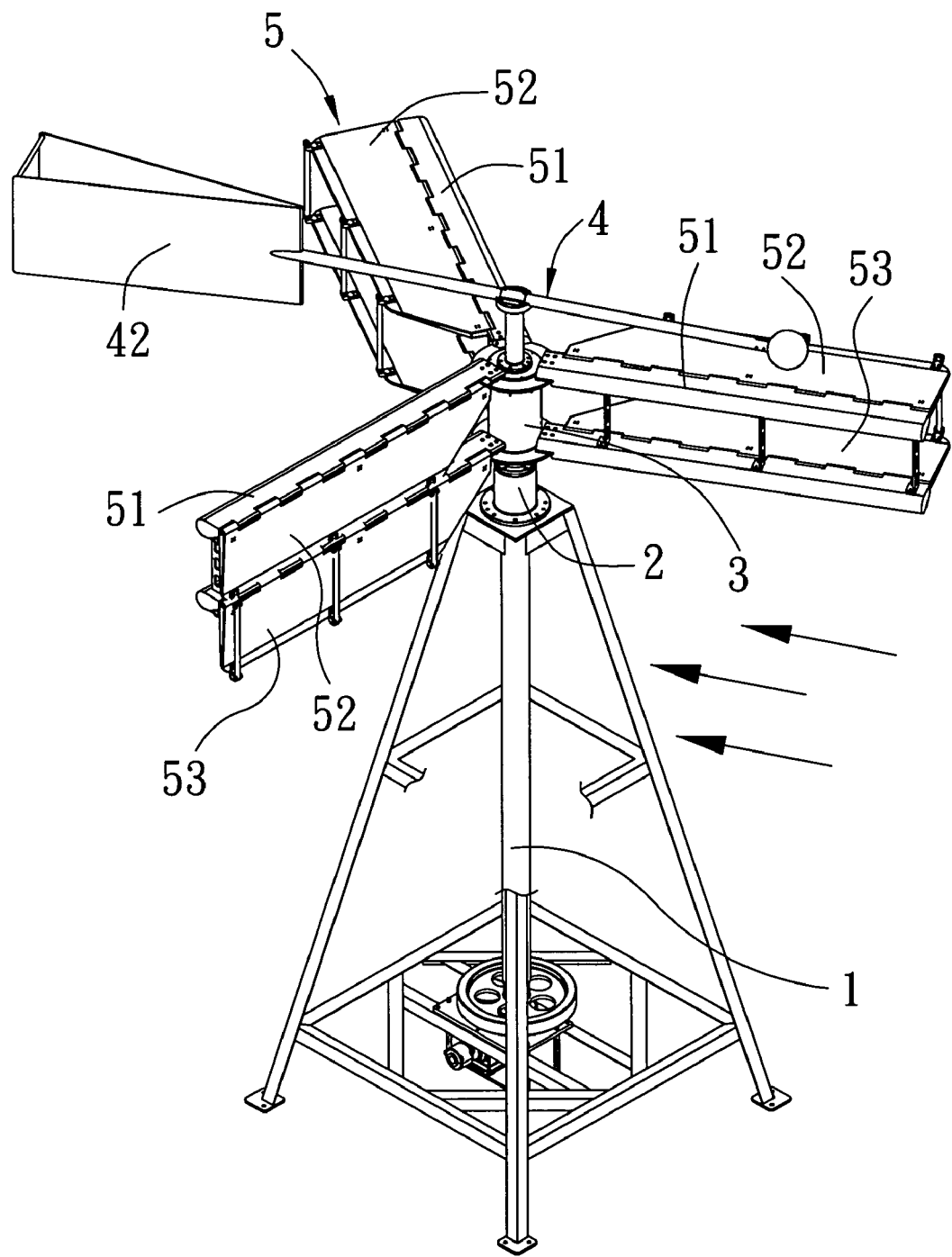
FIG. 1 is a perspective view of the present invention.
Figure 2:
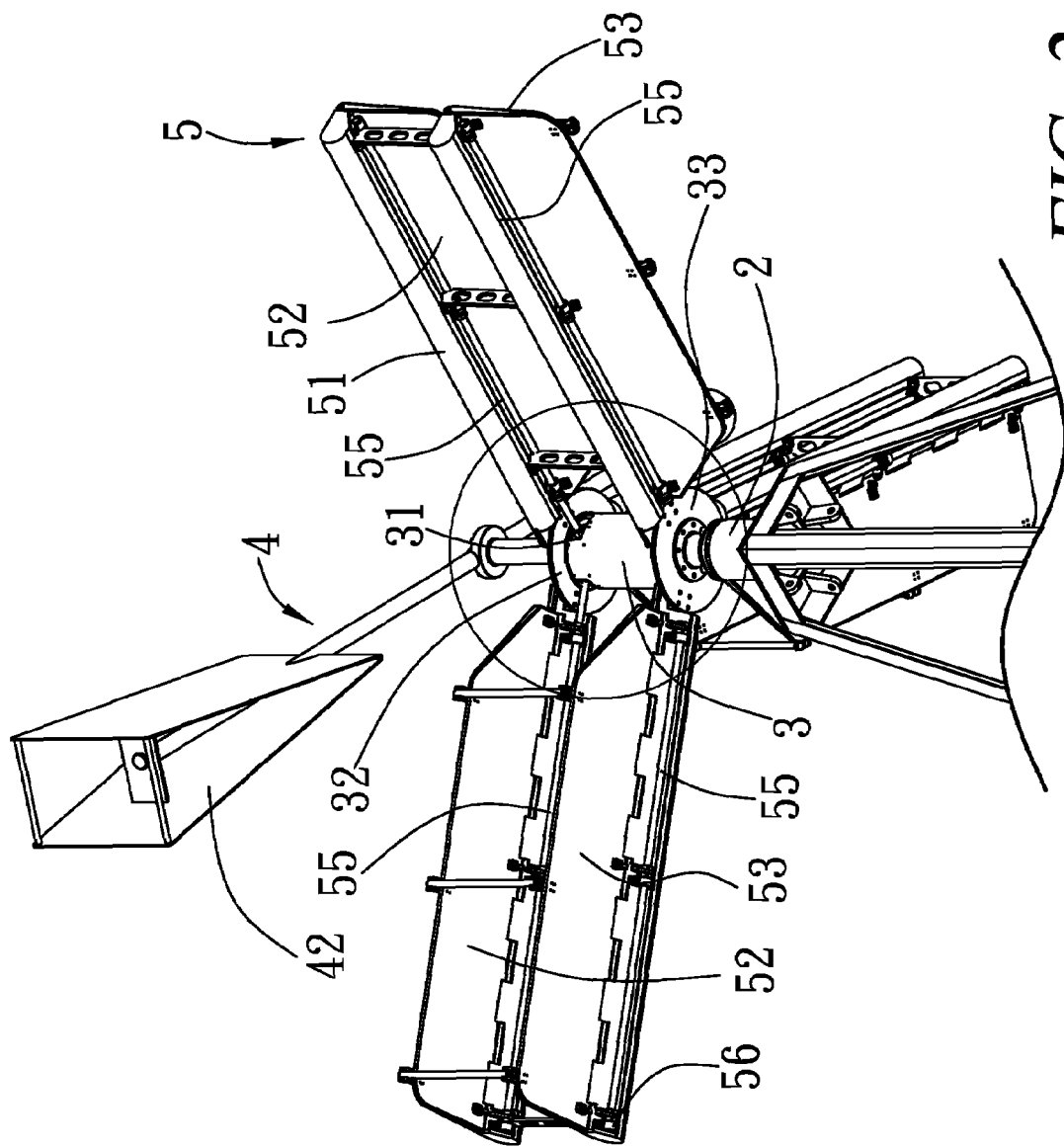
FIG. 2 is a perspective view of the present invention viewed upwardly from the lower left side.
Figure 3:
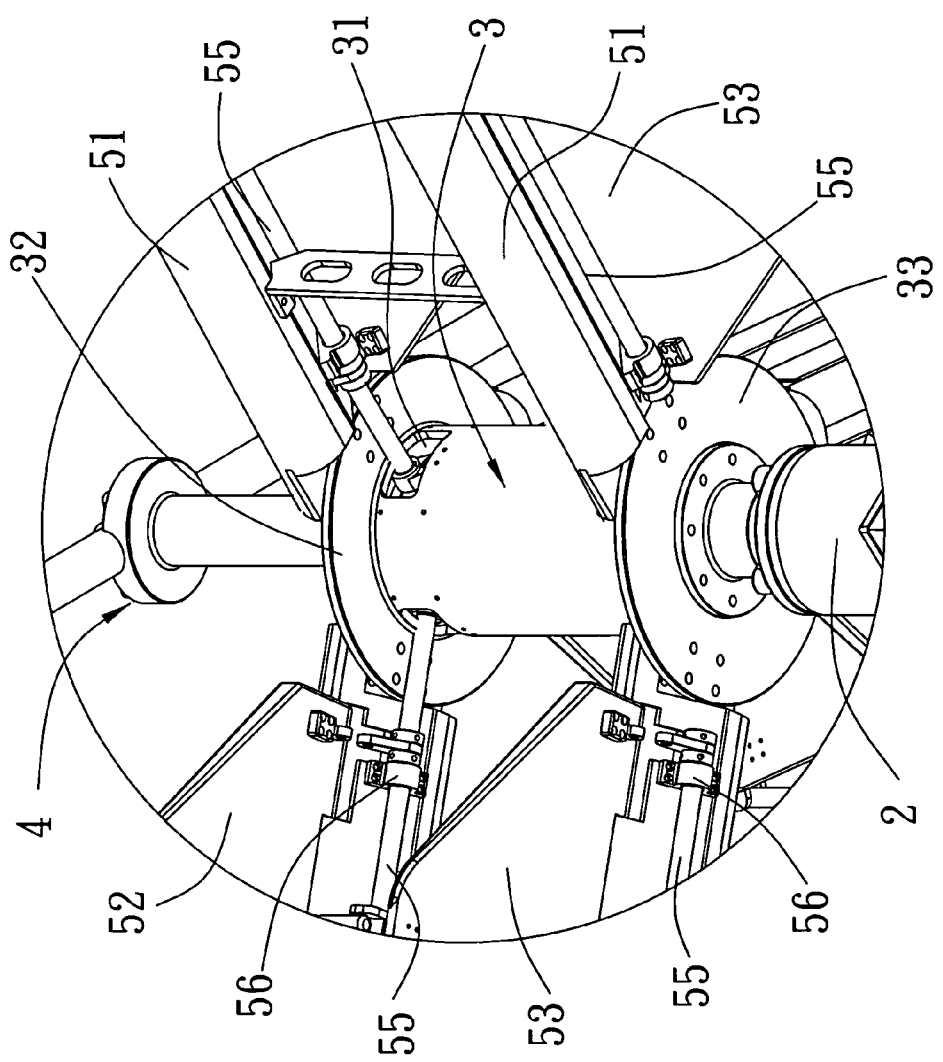
FIG. 3 is an enlarged fractionary view of the foundation and the wing blade assemblies according to the present invention.
Figure 4:
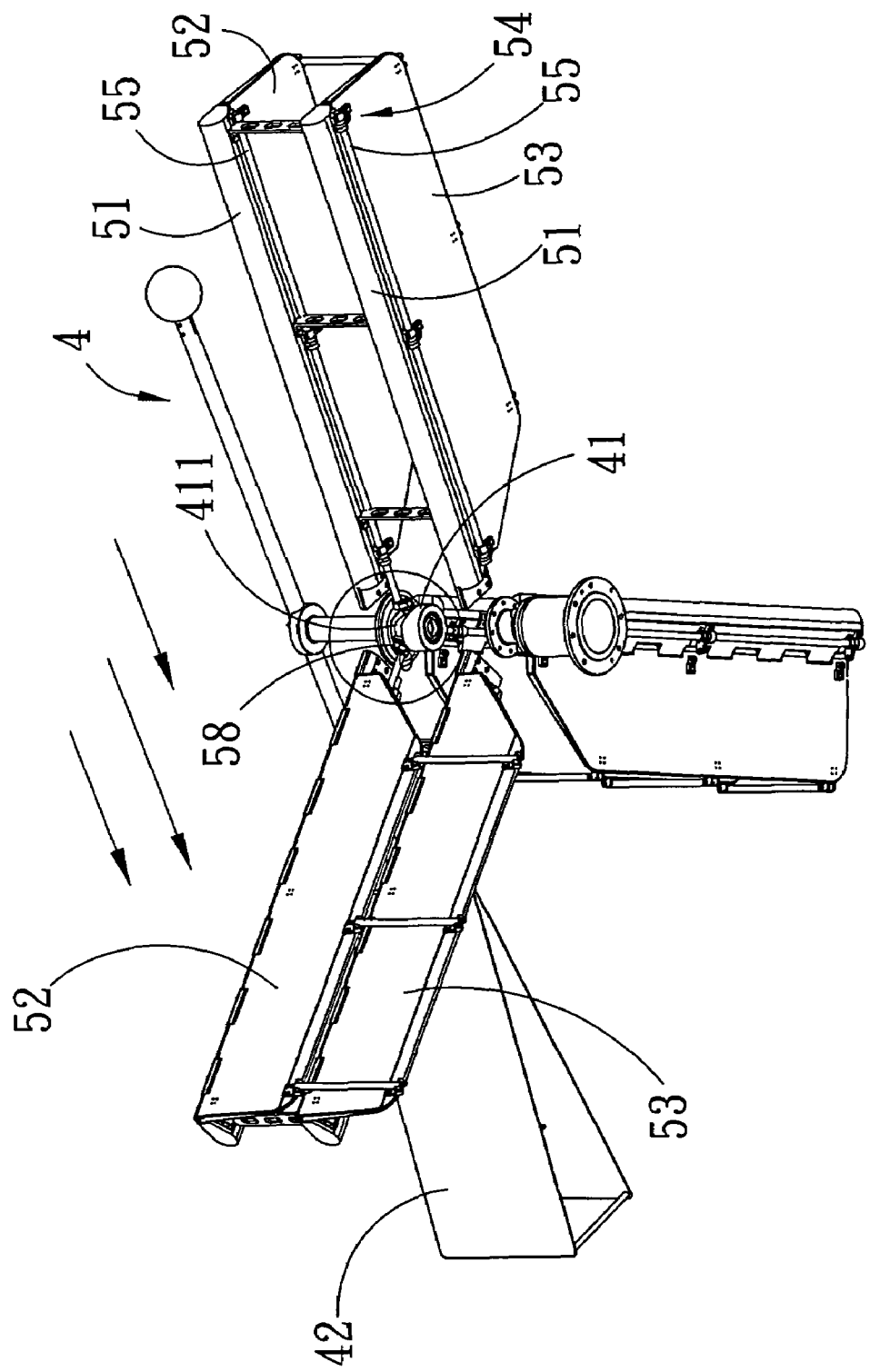
FIG. 4 is a conjoined view of the wind blade assemblies with the rudder assembly through the rolling portion.
Figure 5:
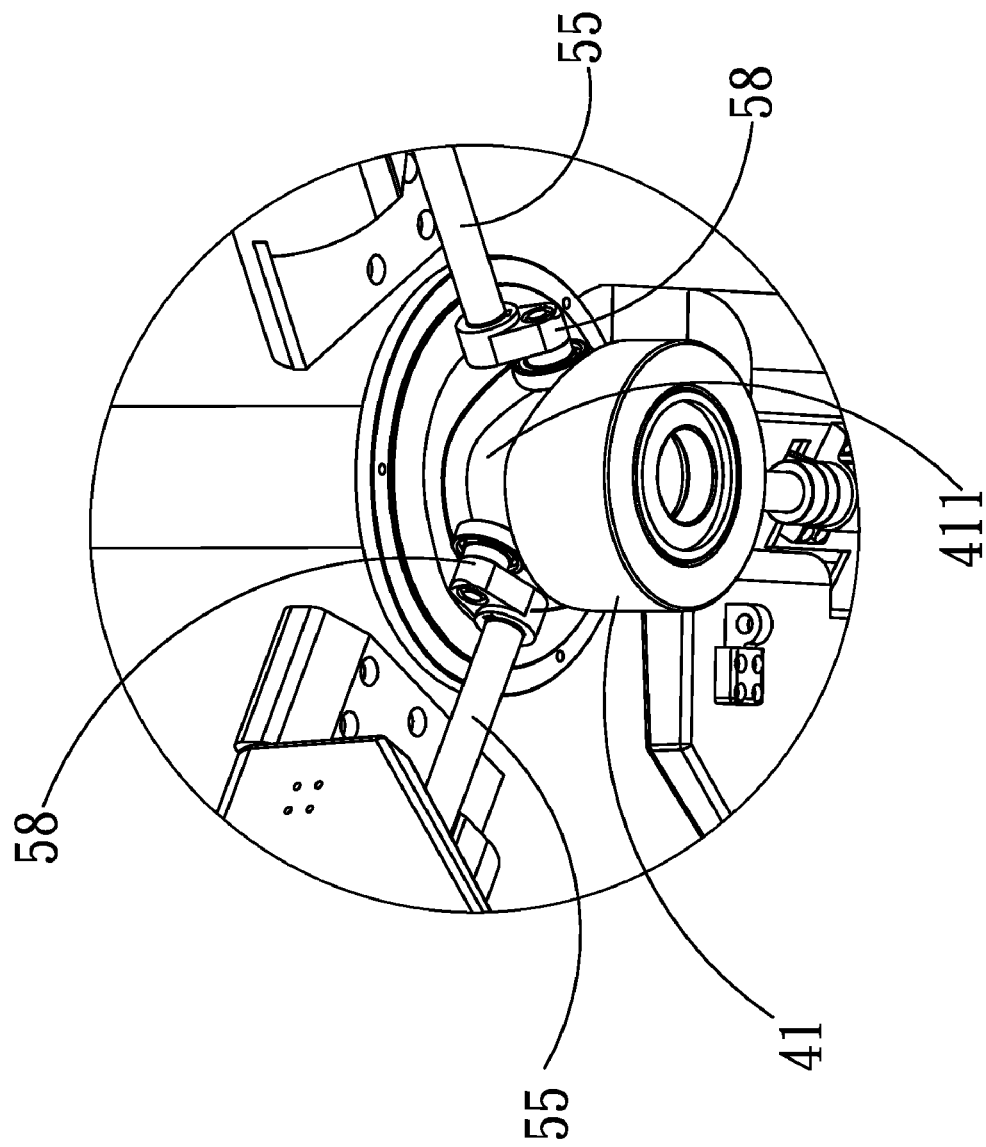
FIG. 5 is an enlarged fractionary view of the rudder assembly through the rolling portion.

As shown in FIG. 3, the axle body 3 has a roller bearing equipped in the top end of its center hole, while the bottom end thereof is conjoined to the output shaft 1, and its external surface is formed of several spigots 31, and provided with an upper joint flange 32 and a lower joint flange 33. The spigots 31 are for insertion of connecting rods 55 of the wing blades assemblies 5, whereas the upper and the lower joint flanges 32, 33 are for jointing upper sail wings 52 and lower sail wings 53 of the wing blade assemblies 5 respectively such that when a rolling portion 58 of the wing blade assembly 5 is moving along a lead rail 411 formed on the external surface of turn table 41 (see FIG. 4 and FIG. 5), the output shaft 1, the axle body 3 can rotate together with, the wind blade assemblies 5.

Figure 8:
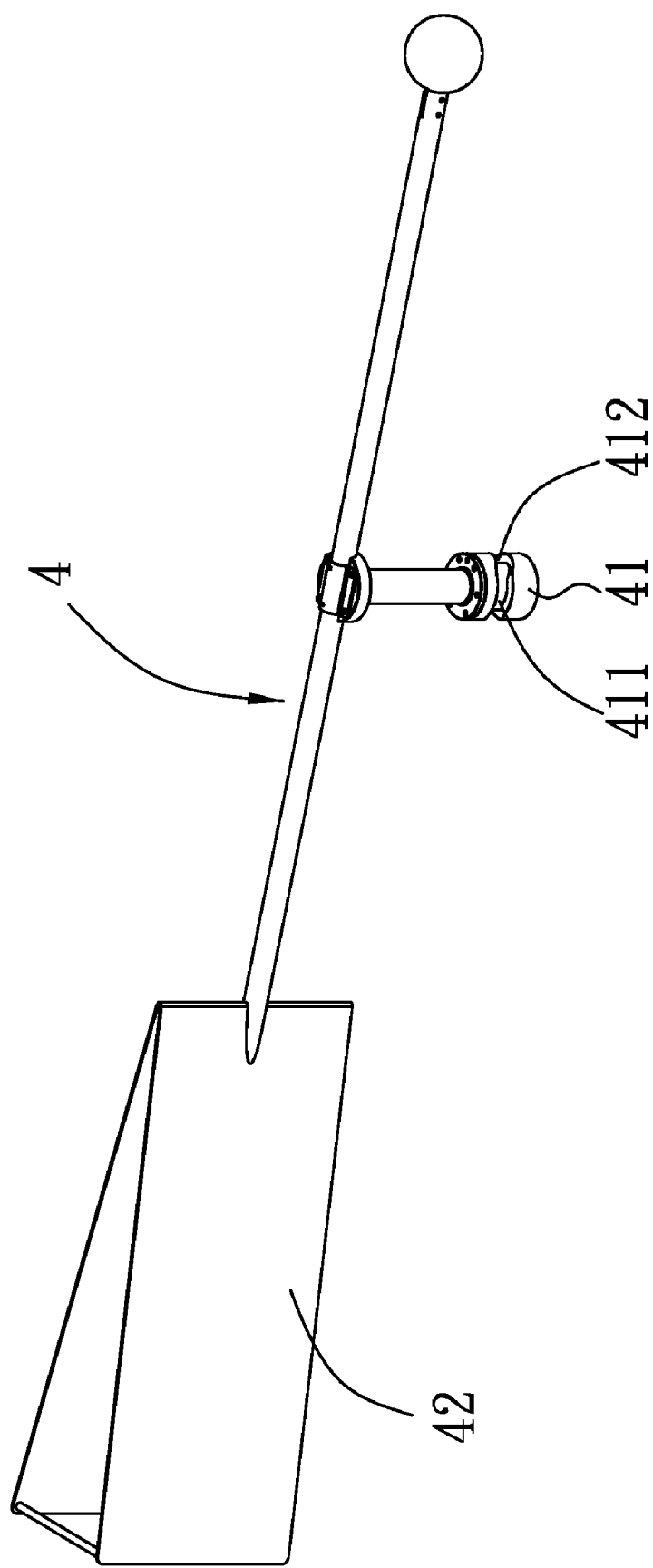
FIG. 8 is a schematic view of the rudder assembly.
Figure 9:
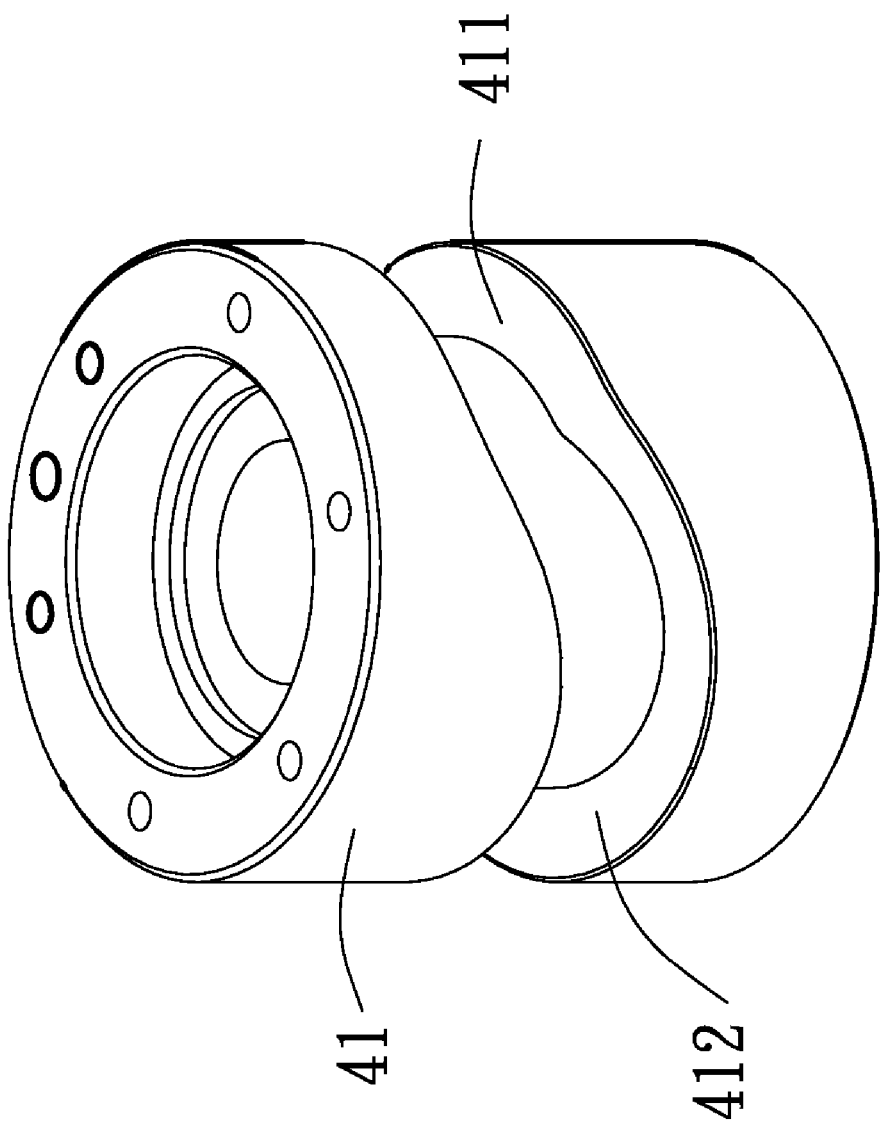
FIG. 9 is a schematic view of the turn table.

As shown in FIG. 8 and FIG. 9, the bottom end of a rudder assembly 4 is conjoined to the top end of the output shaft 1 with a roller bearing such that the rudder assembly 4 can rotate on the top end of the output shaft 1. The turn table 41 of the rudder assembly is equipped in the axle body 3. The external surface of the turn table 41 is provided with a snaking recessed rail 411 which being terminated into a lead portion 412, a twin vaned tail wing 42 attached to the tail of the rudder assembly 4 is constantly facing against the wind direction to turn the turn table 41 when the wind direction varies.

Figure 6:
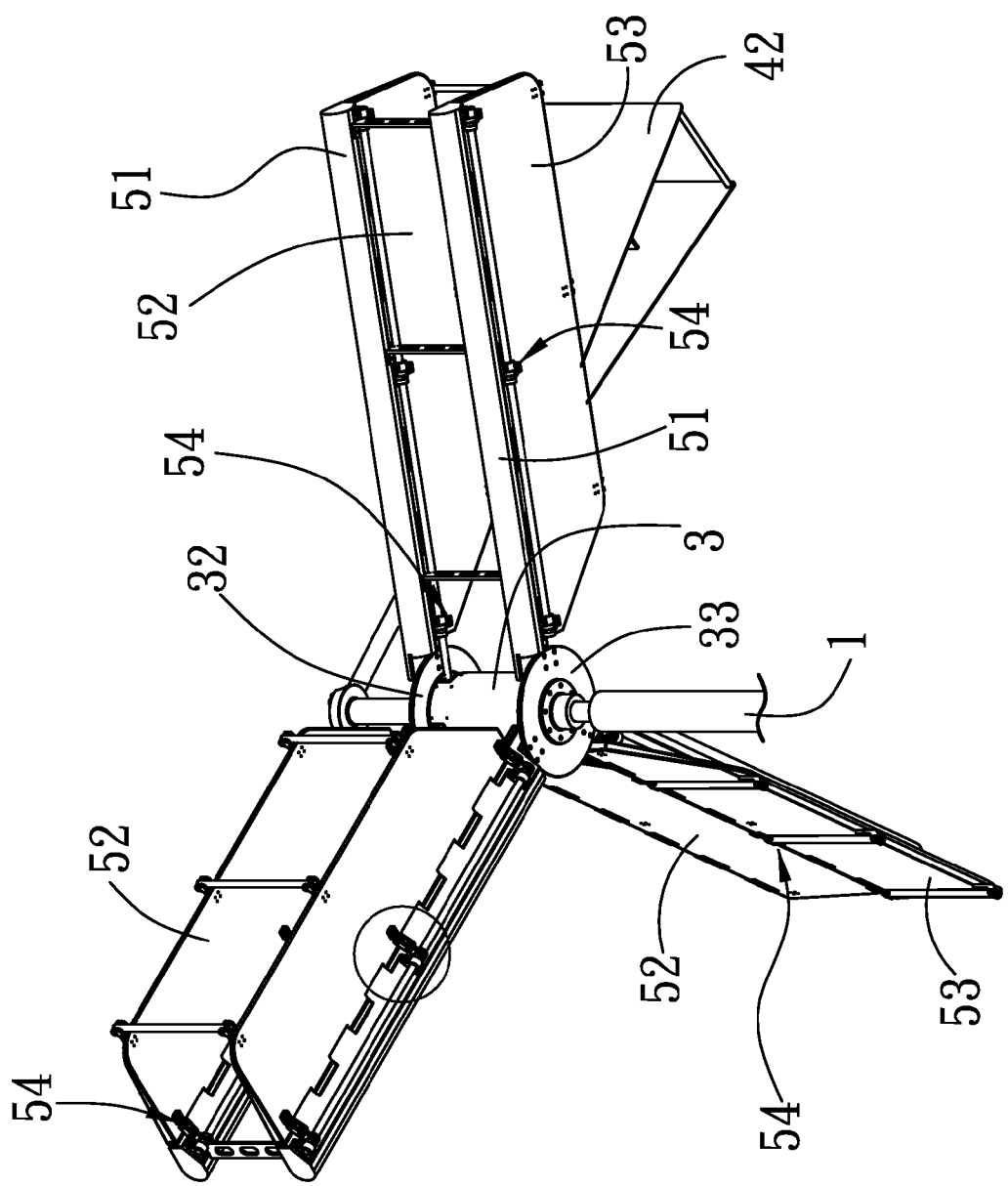
FIG. 6 is a conjoined view of the output shaft, the axle body and the wing blade assemblies.

As shown in FIG. 6, the wing blade assembly 5 is composed of two bracing bars 51, an upper sail wing 52, a lower sail wing 53, and several follower units 54. The wing blade assembly 5 is able to adjust the exerted wind force by swinging its upper and lower sail wings 52 and 53 upwardly and downwardly.

The two bracing bars 51 are jointed their one end respectively to the upper and the lower joint flanges 32 and 33 of the axle body 3 so as to rotate together with the axle body 3.

The upper sail wing 52 is turnably affixed to the rear edge of the upper bracing bar 51, while the lower sail wing 53 is turnably affixed to the rear edge of the lower bracing bar 51.

Figure 7:
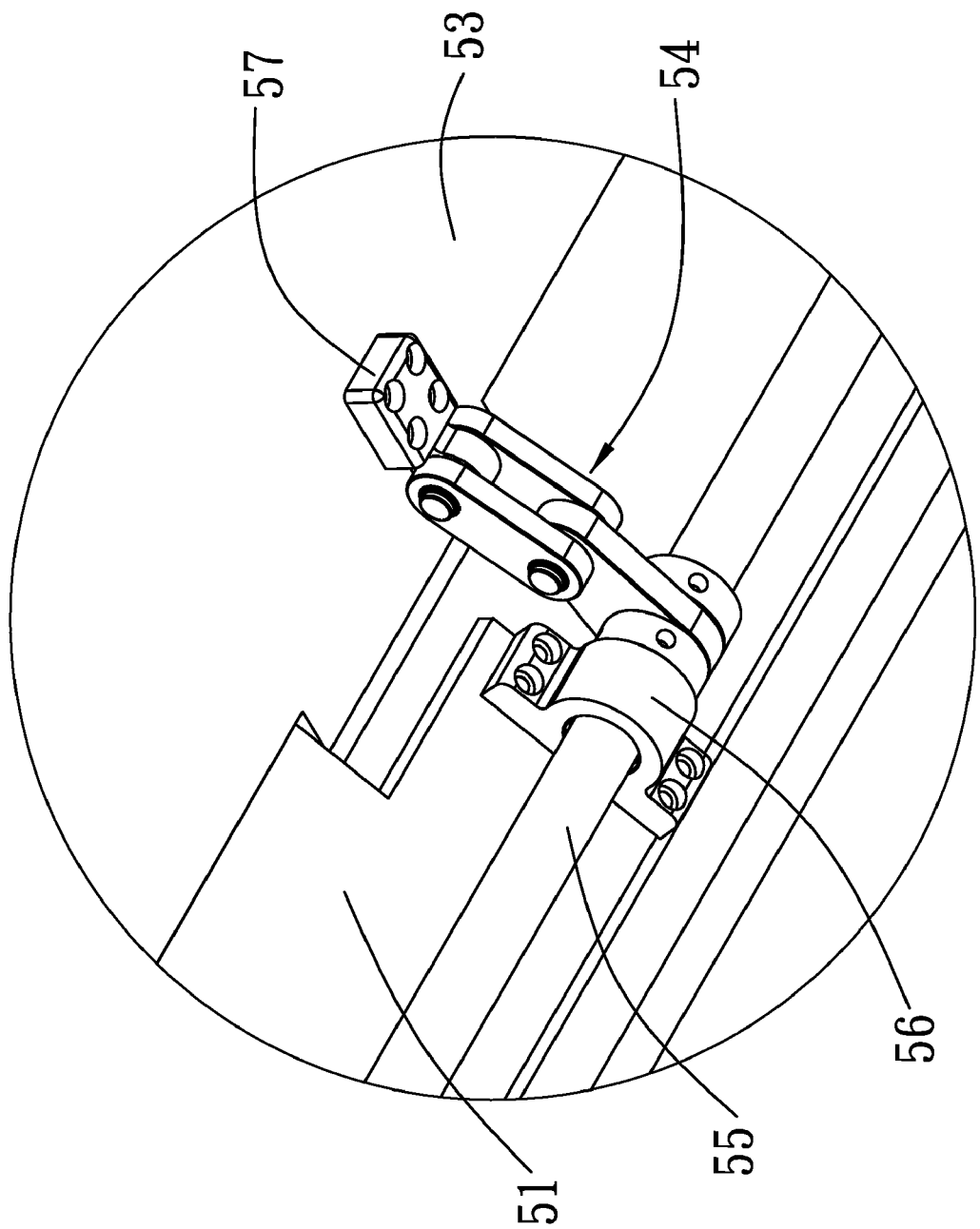
FIG. 7 is a schematic view of the component parts contained in a wing blade assembly.

As shown in FIG. 7, the follower unit 54 consists of a connecting rod 55, a fixed guide ring 56, a follower portion 57, and a rolling portion 58. The follower unit 54 is held on the end of the bracing bar 51 by the fixed guide ring 56, and further fixed to the upper and the lower sail wings 52 and 53. The rolling portion 58 (see FIG. 4) is provided to one end of the connecting rod 55 which being passing through the fixed guide ring 56 and follower portion 57. The connecting rod 55 is turnable in the fixed guide ring 56 but conjoined fixedly to the follower portion 57.

The twin vaned tail wing 42 of the rudder assembly 4 is automatically pointed to the wind direction so as to indicate from where the wind comes. The wing blade assembly 5 makes its rolling portion 58 to move to the lead portion 412 along the lead rail 411, and at the same time, the movement of the rolling portion 58 causes the connecting rod 55 to turn in the fixed guide ring 56 and held onto the bracing bar 51 thereby fixing the upper and the lower sail wings 52 and 53 at position. By so, the connecting rods 55 in connection with both sail wings 52 and 53 are able to swing them downwards simultaneously thereby enlarging their area to accept the wind flow.

As soon as both sail wings 52 and 53 have completely developed downwardly in perpendicular to the wind direction, the effect of the wind pressure exertion reaches the maximum value so that a difference of air molecular flow speed is produced between the front and back sail wings by the viscosity between air molecules and surface of the sail wings. This difference of wind (air molecular) flow speed generate a turning moment which causes to accelerate output shaft rotation.

Afterwards, the rolling portion 58 of the wing blade assembly 5 gradually leaves the lead portion 412 of the rudder assembly 4, it causes the rotation of the connecting rods 55 to swing upwards the sail wings 52 and 53 and obviate their wing surfaces from the wind blow to decrease wind resistance.

With this principle, as the wind continues to blow, the upper and the lower sail wings 52, 53 of the wind blade assembly 5 output a continuous torque to rotate the axle body 3 so as to convert the wind power into a mechanical power.

It is obvious that the sail wing type windmill of the present invention has several significant advantages over conventional techniques, namely:

1. A plurality of sail wings are equipped to continuously and smoothly convert the wind power into the mechanical power.

2. The present invention provides a windmill able to work in all direction without the need of other tracing means for the wind direction from time to time.

Many changes and modifications in the above described embodiment of the invention can of course, be carried out without departing from the scope thereof. Accordingly, to promote the progress in science and the useful arts, the invention is disclosed and is intended to be limited only by the scope of the appended claims.

What is claimed is:

1. A sail wing type windmill comprising;

an output shaft erected vertically;

a foundation with a bearing disposed in a center hole provided in the foundation for supporting the output shaft to rotate therein;

an axle body with a bottom end being conjoined to the output shaft, and an external surface being formed of several spigots, and provided with an upper joint flange and a lower joint flange;

a rudder assembly turnably conjoined to a top end of the output shaft and including a turn table, and a twin vaned tail wing, wherein the turn table is inserted in the center hole of the axle body, an external surface of the turn table is provided with a snaking recessed lead rail terminated into a lead portion thereof, the twin vaned tail wing is for constantly pointing to a wind direction and turning the turn table with wind force; and a wing blade assembly including:

two bracing bars respectively jointed to the upper and the lower joint flanges of the axle body with one ends thereof;

an upper sail wing jointed to a rear edge of the upper bracing bar;

a lower sail wing jointed to a rear edge of the lower bracing bar; and a plurality of follower units, each including a connecting rod, a fixed guide ring, a follower portion, and a rolling portion, the follower unit being held at an end portion of the bracing bar with the fixed guide ring, and is fixed to the upper and the lower sail wings, wherein the rolling portion is installed at one end of the connecting rod, while the connecting rod passes through the fixed guide ring and the follower portion to be able to rotate in the fixed guide ring and conjoined to the follower portion.

2. The windmill of claim 1, wherein the spigots of the axle body are for supporting the connecting rods of the wing blade assemblies by insertion.

* * * * *